(12) United States Patent
Terasawa

(10) Patent No.: US 12,246,346 B2
(45) Date of Patent: Mar. 11, 2025

(54) DRIVE CONTROL DEVICE AND ULTRASONIC MOTOR SYSTEM

(71) Applicant: Murata Manufacturing Co., Ltd., Nagaokakyo (JP)

(72) Inventor: Mitsushiro Terasawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 190 days.

(21) Appl. No.: 18/086,816

(22) Filed: Dec. 22, 2022

(65) Prior Publication Data

US 2023/0130784 A1    Apr. 27, 2023

Related U.S. Application Data

(63) Continuation of application No. PCT/JP2021/029006, filed on Aug. 4, 2021.

(30) Foreign Application Priority Data

Aug. 21, 2020   (JP) ................. 2020-140130

(51) Int. Cl.
| | |
|---|---|
| *G02B 7/04* | (2021.01) |
| *B06B 1/02* | (2006.01) |
| *B06B 1/06* | (2006.01) |

(52) U.S. Cl.
CPC .......... *B06B 1/0215* (2013.01); *B06B 1/0644* (2013.01)

(58) Field of Classification Search
CPC ....... B06B 1/0215; B06B 1/0644; B06B 3/02; G02B 7/04
See application file for complete search history.

(56) References Cited

U.S. PATENT DOCUMENTS

| | | | |
|---|---|---|---|
| 9,448,613 B1 | 9/2016 | Liljegren et al. | |
| 2007/0046144 A1 | 3/2007 | Urano | |
| 2011/0215675 A1 | 9/2011 | Asano | |
| 2015/0288298 A1* | 10/2015 | Uebayashi | ............... G02B 7/04 310/317 |
| 2019/0209790 A1* | 7/2019 | Maeda | ...................... B06B 3/02 |

FOREIGN PATENT DOCUMENTS

| | | | |
|---|---|---|---|
| CN | 204028602 U | * | 12/2014 |
| JP | H0322879 A | | 1/1991 |
| JP | 2592972 Y2 | | 3/1999 |
| JP | 2000078863 A | | 3/2000 |
| JP | 2007151378 A | | 6/2007 |
| WO | 2010061508 A1 | | 6/2010 |

OTHER PUBLICATIONS

International Search Report in PCT/JP2021/029006, mailed Oct. 26, 2021, 3 pages.

* cited by examiner

*Primary Examiner* — Cortez M Cook
(74) *Attorney, Agent, or Firm* — ArentFox Schiff LLP

(57) ABSTRACT

A drive control device is provided that drives an ultrasonic motor element including a piezoelectric element. The drive control device includes a voltage divider circuit unit resistor forming a voltage divider circuit unit together with an identification resistor that identifies the ultrasonic motor element; a control circuit unit connected to the voltage divider circuit unit and that sets a drive condition of the ultrasonic motor element according to a voltage of an identification signal for identifying the ultrasonic motor element; and a drive circuit unit that applies a drive voltage to the piezoelectric element based on the drive condition set by the control circuit unit.

18 Claims, 10 Drawing Sheets

STANDING WAVE X

STANDING WAVE Y

TRAVELING WAVE

DRIVE CONTROL DEVICE AND ULTRASONIC MOTOR SYSTEM

CROSS REFERENCE TO RELATED APPLICATIONS

This application is a continuation of PCT Application No. PCT/JP2021/029006, filed Aug. 4, 2021, which claims priority to Japanese Patent Application No. 2020-140130, filed Aug. 21, 2020, the entire contents of each of which are hereby incorporated by reference in their entirety.

TECHNICAL FIELD

The present invention relates to a drive control device that drives a driving body including a piezoelectric element, and an ultrasonic motor system including a piezoelectric element.

BACKGROUND

To date, a variety of ultrasonic motor elements that vibrate a stator by a piezoelectric element have been proposed. For example, an ultrasonic motor element described in WO 2010/061508 (hereinafter "Patent Document 1") includes a stator including a plurality of piezoelectric elements and a rotor in contact with the stator. When signals out of phase with each other are applied to the plurality of piezoelectric elements, the stator vibrates, which in turn rotates the rotor.

Signals are input to the ultrasonic motor element by, for example, a drive circuit as described in Japanese Patent Application 2000-078863 (hereinafter "Patent Document 2"). This drive circuit includes two 8-bit D/A converters and a ladder resistance network. A rotational speed command value with 16-bit resolution is divided and input to the two 8-bit D/A converters. Thus, the rotational speed of the ultrasonic motor element can be controlled with 16-bit resolution by using the 8-bit A/D converters provided in a microcomputer.

In general, an optimum frequency of a signal to be applied to a piezoelectric element varies depending on a contact pressure between a stator and a rotor, the temperature of an ultrasonic motor element, and a load applied to the ultrasonic motor element. Thus, if the frequency of the input signal is kept constant, it is difficult to increase the rotation efficiency of the ultrasonic motor element. Furthermore, piezoelectric elements or metal members used for the ultrasonic motor element have variations based on individual differences. In order to increase the rotation efficiency of the ultrasonic motor element, it is necessary to change a frequency sweep range for each ultrasonic motor element. However, when the above-described measure is performed by using the ultrasonic motor element described in Patent Document 1 or the drive circuit described in Patent Document 2, frequency sweep time varies in each ultrasonic motor element. Therefore, it is difficult to effectively improve the rotation efficiency of the ultrasonic motor element.

SUMMARY OF THE INVENTION

Accordingly, it is an object of the present invention to provide a drive control device and an ultrasonic motor system that enhances rotation efficiency.

In an exemplary aspect, a drive control device is provided device that drives an ultrasonic motor element including a piezoelectric element. In this aspect, the drive control device includes a voltage divider circuit unit resistor forming a voltage divider circuit unit together with an identification resistor that identifies the ultrasonic motor element; a control circuit unit connected to the voltage divider circuit unit and configured to set a drive condition of the ultrasonic motor element according to a voltage of an identification signal for identifying the ultrasonic motor element; and a drive circuit unit configured to apply a drive voltage to the piezoelectric element based on the drive condition set by the control circuit unit.

In another exemplary aspect, an ultrasonic motor system is provided that includes the drive control device configured as discussed above and the ultrasonic motor element that includes the piezoelectric element and the identification resistor.

In another exemplary aspect of the ultrasonic motor system, the ultrasonic motor system includes the drive control device configured as discussed above and the ultrasonic motor element that includes a plurality of the piezoelectric elements and a plurality of the identification resistors.

In still another exemplary aspect, the ultrasonic motor system is provided and includes the drive control device configured as discussed above and a plurality of the ultrasonic motor elements that each include the piezoelectric element and the identification resistor.

Thus, according to the present invention, a drive control device and an ultrasonic motor system are provided that are configured for easily enhancing rotation efficiency.

DETAILED DESCRIPTION

Hereinafter, the present invention will be clarified by describing specific exemplary embodiments with reference to the drawings.

It should be noted that the embodiments described in the present specification are illustrative, and partial replacement or combination of configurations in different embodiments is possible as would be appreciated to one skilled in the art.

Figure 1:
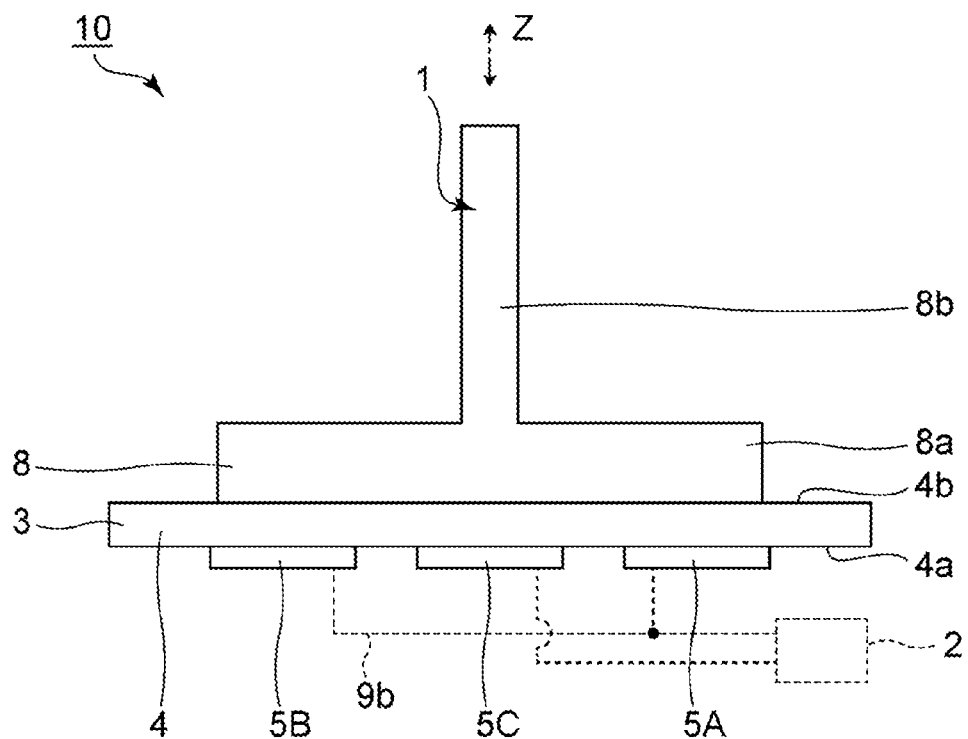
FIG. 1 is a connection relationship diagram of an ultrasonic motor element and a drive control circuit thereof according to a first exemplary embodiment.

FIG. 1 is a connection relationship diagram of an ultrasonic motor element and a drive control circuit thereof according to a first exemplary embodiment.

As shown, an ultrasonic motor system 10 includes a drive control device 2 and an ultrasonic motor element 1 that includes a stator 3 and a rotor 8. In the ultrasonic motor system 10, a driving signal is applied from the drive control device 2 to the stator 3. As a result, the stator 3 is vibrated to generate a traveling wave that goes around an axial direction Z. Here, the stator 3 and the rotor 8 are in contact with each other. The rotor 8 is then rotated by the traveling wave generated in the stator 3. Hereinafter, a specific configuration of the ultrasonic motor system 10 will be described.

As illustrated in FIG. 1, the stator 3 includes a vibrator 4 that has a disk shape. The vibrator 4 has a first main surface 4a and a second main surface 4b. The first main surface 4a and the second main surface 4b are on opposite sides. In the present specification, the axial direction Z is a direction connecting the first main surface 4a and the second main surface 4b, and is a direction along the rotation center. It is noted that the shape of the vibrator 4 is not limited to the disk shape. For example, the shape of the vibrator 4 viewed in the axial direction Z may be, for example, a regular polygon such as a regular hexagon, a regular octagon, or a regular decagon. Moreover, the vibrator 4 can be made of a metal in an exemplary aspect, but may also be formed of other elastic bodies, such as ceramics, a silicon material, or a synthetic resin, for example.

Here, a piezoelectric element described in the following embodiment is polarized in a plurality of directions. Examples of the piezoelectric element polarized in a plurality of directions include one piezoelectric element having a different polarization direction for each region. Examples of the piezoelectric element polarized in a plurality of directions also include a plurality of piezoelectric elements having different polarization directions from each other.

The piezoelectric element polarized in a plurality of directions is provided on the first main surface 4a of the vibrator 4. Specifically, the plurality of piezoelectric elements are provided on the first main surface 4a. The second main surface 4b of the vibrator 4 is in contact with the rotor 8. Moreover, the rotor 8 includes a rotor body 8a and a rotating shaft 8b. The rotor body 8a has a disk shape. One end of the rotating shaft 8b is connected to the rotor body 8a. The rotor body 8a is in contact with the second main surface 4b of the vibrator 4. It is also noted that the shape of the rotor body 8a is not limited to the disk shape and, when viewed in the axial direction Z, can also be, for example, a regular polygon such as a regular hexagon, a regular octagon, or a regular decagon.

Figure 2:
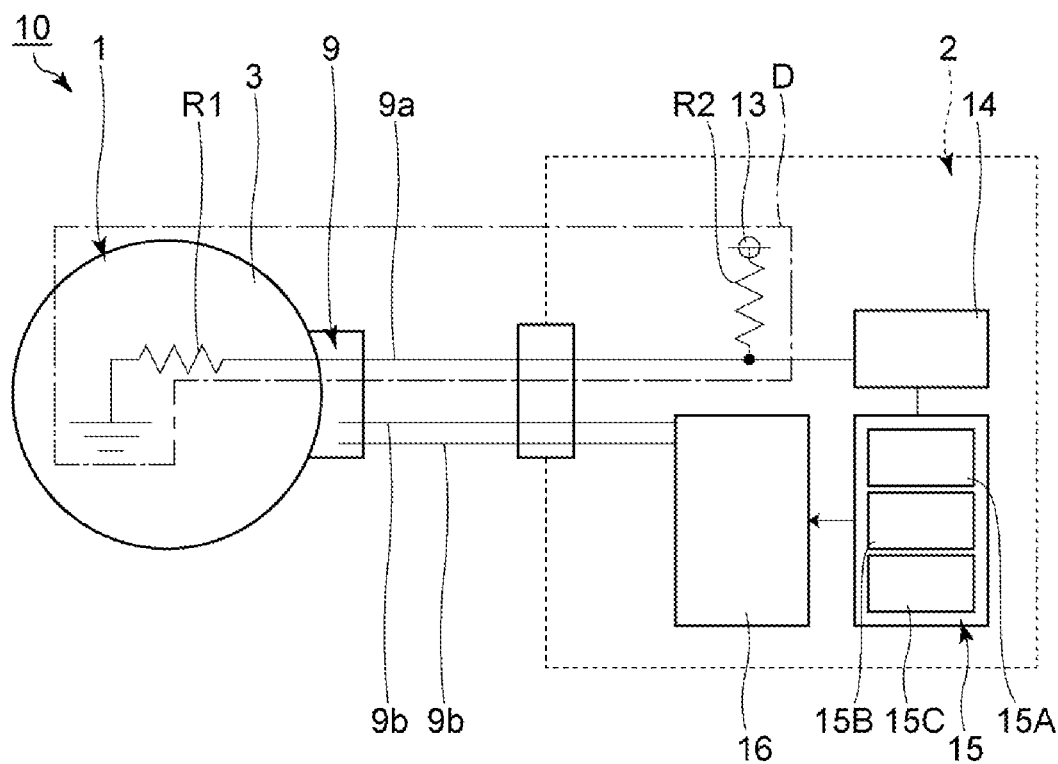
FIG. 2 is a schematic control circuit diagram of an ultrasonic motor system according to the first exemplary embodiment.

FIG. 2 is a schematic control circuit diagram of the ultrasonic motor system according to the first exemplary embodiment.

As shown, the ultrasonic motor element 1 includes an identification resistor R1 for identifying the ultrasonic motor element. The identification resistor R1 may directly identify the ultrasonic motor element itself. Alternatively, the identification resistor R1 may indirectly identify the ultrasonic motor element by identifying a piezoelectric element. Specifically, the identification resistor R1 may identify a set of piezoelectric elements including the plurality of piezoelectric elements in the ultrasonic motor element as one set, or may identify each of the piezoelectric elements. Moreover, a resistance value of the identification resistor can be set for each ultrasonic motor element, each set of piezoelectric elements, or each piezoelectric element according to various exemplary aspects. As further shown, the ultrasonic motor element 1 and the drive control device 2 are connected by a connector 9, which includes an identification signal wire 9a and a drive signal wire 9b.

In addition, the drive control device 2 includes a power supply unit 13, a voltage divider circuit unit resistor R2, an analog-to-digital conversion unit 14, a control circuit unit 15, and a drive circuit unit 16. The voltage divider circuit unit resistor R2 forms a voltage divider circuit unit D together with the identification resistor R1 of the ultrasonic motor element 1. The resistors of the identification resistor R1 and the voltage divider circuit unit resistor R2 are connected in series or in parallel according to exemplary aspects. This configuration improves the distribution of variations in a combined resistance value.

More specifically, the voltage divider circuit unit resistor R2 branches on one end side so as to be connected to the identification resistor R1 and the control circuit unit 15. In the present embodiment, the voltage divider circuit unit resistor R2 is indirectly connected to the control circuit unit 15 with the analog-to-digital conversion unit 14 interposed therebetween. In alternative aspects, the analog-to-digital conversion unit 14 is not necessarily provided. The voltage divider circuit unit resistor R2 and the identification resistor R1 are connected by the identification signal wire 9a of the connector 9. The voltage divider circuit unit resistor R2 is connected to the power supply unit 13 on the other end side. The identification resistor R1 is connected to the voltage divider circuit unit resistor R2 on one end side, and is connected to ground potential on the other end side. In this way, the voltage divider circuit unit D is configured. Thus, in the present embodiment, the voltage divider circuit unit resistor R2 is a bleeder resistor.

As described above, the analog-to-digital conversion unit 14 is connected between the voltage divider circuit unit D and the control circuit unit 15. Furthermore, the control circuit unit 15 is connected to the drive circuit unit 16. The drive circuit unit 16 is connected to the drive signal wire 9b of the connector 9. The drive signal wire 9b is connected to each piezoelectric element of the ultrasonic motor element 1. In operation, the drive circuit unit 16 is configured to apply a drive voltage to each piezoelectric element.

An identification signal for identifying the ultrasonic motor element 1 is transmitted from the voltage divider circuit unit D to the control circuit unit 15. More specifically, the signal is converted into a digital signal by the analog-to-digital conversion unit 14. The control circuit unit 15 receives the converted signal. Here, the voltage of the identification signal transmitted from the voltage divider circuit unit D corresponds to resistance voltage division determined by the resistance values of the identification resistor R1 and the voltage divider circuit unit resistor R2. Therefore, the ultrasonic motor element 1 can be identified by measuring the voltage of the identification signal.

It is noted that the power supply unit 13, the voltage divider circuit unit resistor R2, the analog-to-digital conversion unit 14, the control circuit unit 15, and the drive circuit unit 16 are conceptually separately described in order to describe the respective functions, but do not need to be physically separated from each other in various exemplary aspects. For example, the power supply unit 13, the voltage divider circuit unit resistor R2, the analog-to-digital conversion unit 14, the control circuit unit 15, and the drive circuit unit 16 may be included in a single microcomputer in one aspect, which includes a processor and software stored thereon, which, when executed by the processor, executes the algorithms described herein. Moreover, the drive control device 2 does not have to include the power supply unit 13, and may be connected to an external power supply.

Moreover, the present embodiment is characterized in that the ultrasonic motor element 1 includes the identification resistor R1. The present embodiment is further characterized in that the drive control device 2 includes the voltage divider circuit unit resistor R2 that forms the voltage divider circuit unit D together with the identification resistor R1, and the control circuit unit 15 that sets a drive condition of the piezoelectric elements according to the voltage of the received identification signal. Frequency sweep suitable for each piezoelectric element can be thereby performed. Therefore, frequency sweep time can be shortened, and the time hardly varies. Consequently, an optimum frequency can be easily set for each piezoelectric element, and the rotation efficiency of the ultrasonic motor element 1 can be easily enhanced. The details thereof will be described below together with the details of the configuration of the present embodiment.

Figure 3:
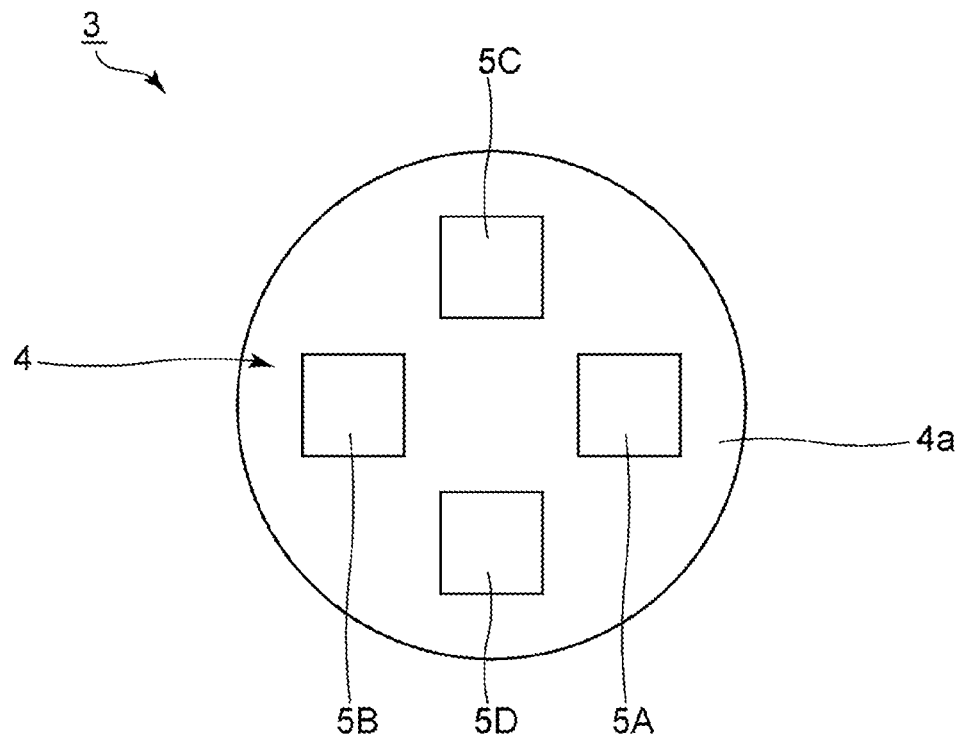
FIG. 3 is a bottom view of a stator according to the first exemplary embodiment.

FIG. 3 is a bottom view of the stator according to the first exemplary embodiment.

In the present embodiment, the piezoelectric elements polarized in a plurality of directions include a first piezoelectric element 5A, a second piezoelectric element 5B, a third piezoelectric element 5C, and a fourth piezoelectric element 5D. The plurality of piezoelectric elements are attached to the vibrator 4 with an adhesive. As the adhesive, for example, an epoxy resin, a polyethylene resin, or the like can be used in various exemplary aspects.

The piezoelectric elements polarized in a plurality of directions are distributed along a circumferential direction of a traveling wave that goes around an axis parallel to the axial direction Z so as to generate the traveling wave. When viewed in the axial direction Z, the first piezoelectric element 5A and the second piezoelectric element 5B face each other across the axis. The third piezoelectric element 5C and the fourth piezoelectric element 5D face each other across the axis.

Figure 4:
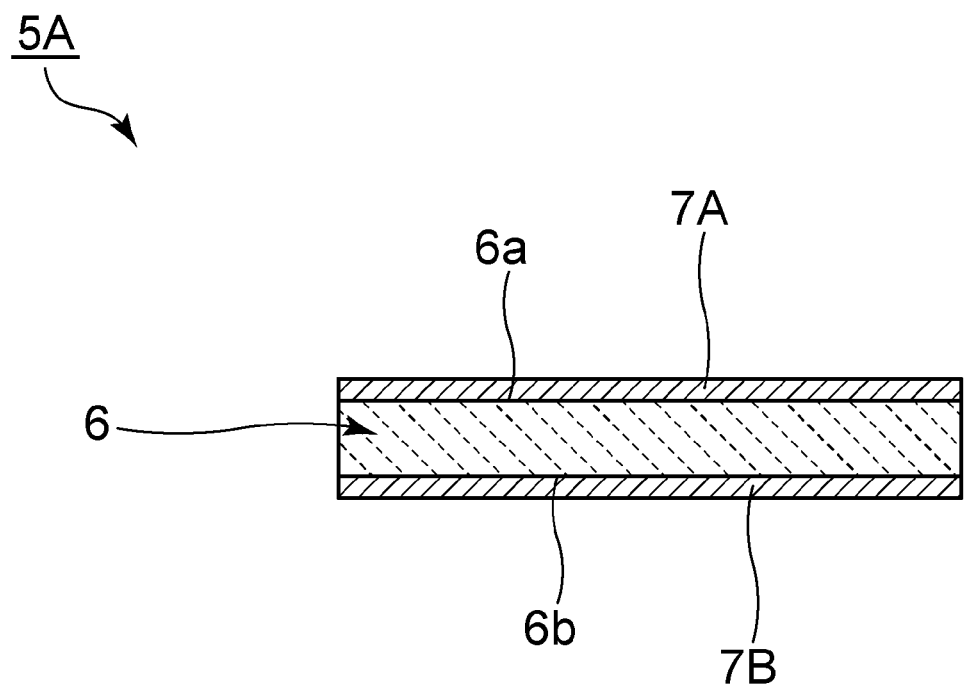
FIG. 4 is a front sectional view of a first piezoelectric element according to the first exemplary embodiment.

FIG. 4 is a front sectional view of the first piezoelectric element according to the first embodiment.

As shown, the first piezoelectric element 5A includes a piezoelectric body 6. The piezoelectric body 6 has a third main surface 6a and a fourth main surface 6b. The third main surface 6a and the fourth main surface 6b are on opposite sides. The first piezoelectric element 5A includes a first electrode 7A and a second electrode 7B. The piezoelectric body 6 is polarized from the third main surface 6a to the fourth main surface 6b. The first electrode 7A is provided on the third main surface 6a of the piezoelectric body 6, and the second electrode 7B is provided on the fourth main surface 6b.

The second piezoelectric element 5B, the third piezoelectric element 5C, and the fourth piezoelectric element 5D are configured similarly to the first piezoelectric element 5A. However, the piezoelectric body 6 in the first piezoelectric element 5A and the piezoelectric body 6 in the second piezoelectric element 5B are polarized in directions opposite to each other. Therefore, when the same signal is applied to the first piezoelectric element 5A and the second piezoelectric element 5B, the first piezoelectric element 5A and the second piezoelectric element 5B vibrate out of phase with each other. The piezoelectric body 6 of the third piezoelectric element 5C and the piezoelectric body 6 of the fourth piezoelectric element 5D are also polarized in directions opposite to each other. That is, the first, second, third, and fourth piezoelectric elements 5A, 5B, 5C, and 5D are piezoelectric elements polarized in a plurality of directions. The piezoelectric elements polarized in a plurality of directions are electrically connected to the drive control device 2 by the drive signal wire 9b.

Here, resonance frequencies of the piezoelectric elements vary depending on individual differences of the piezoelectric bodies, the thickness of the adhesive bonding the piezoelectric elements and the vibrator, or the like. Therefore, in the present embodiment, the resonance frequency of each piezoelectric element in the stator 3 is measured. The identification resistor R1 having a resistance value according to this result is disposed in the ultrasonic motor element 1. In the present embodiment, the first piezoelectric element 5A, the second piezoelectric element 5B, the third piezoelectric element 5C, and the fourth piezoelectric element 5D are one set of piezoelectric elements. The identification resistor R1 having a resistance value according to the above-described one set of piezoelectric elements is disposed in the ultrasonic motor element 1. In alternative aspects, a plurality of identification resistors according to the resonance frequencies of the individual piezoelectric elements may be disposed. In operation, the drive control device 2 vibrates the piezoelectric elements to vibrate the stator 3 according to a flow illustrated in FIG. 5.

Figure 5:
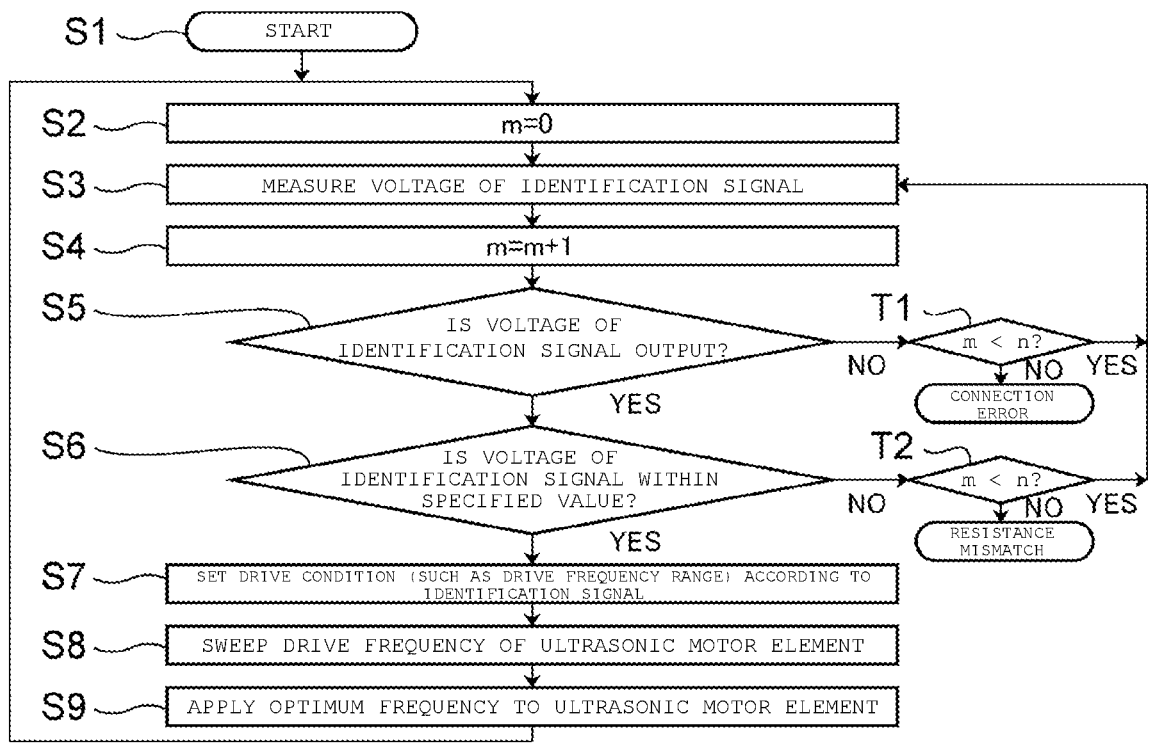
FIG. 5 is a flowchart illustrating an operation procedure of a drive control device according to the first exemplary embodiment.

FIG. 5 is a flowchart illustrating an operation procedure of the drive control device according to the first exemplary embodiment.

As illustrated in FIG. 5, the operation is started at step S1. At step S2, a counter m is set to 0. The control circuit unit 15 performs the counting of the counter m. More specifically, the control circuit unit 15 includes a measurement unit 15A, a storage unit 15B, and a control unit 15C. The control unit 15C performs the counting of the counter m.

At step S3, the voltage of the identification signal is measured. The identification signal is converted into a digital signal by the analog-to-digital conversion unit 14. The voltage of the converted identification signal is measured by the measurement unit 15A of the control circuit unit 15. However, a measurement unit may be disposed separately from the control circuit unit 15. In this case, the control circuit unit 15 does not have to include the measurement unit 15A.

At step S4, the counter m is incremented by one. At step S5, it is determined whether the voltage of the identification signal is output. This determination is made in the control unit 15C of the control circuit unit 15. When it is determined that the voltage of the identification signal is not output, there is a possibility that connection between the ultrasonic motor element 1 and the drive control device 2 has a problem (e.g., is disconnected). At step S5, an inspection is performed as to whether there is a problem with the connection. When it is determined that the voltage of the identification signal is not output, the process proceeds to step T1.

At step T1, it is determined whether the counter m is smaller than a set value n. This determination is made in the control unit 15C of the control circuit unit 15. The set value n may be set to any value. When it is determined that m<n, the process returns to step S3. After the voltage of the identification signal is measured again at step S3, the counter m is incremented by one at step S4. It is then determined whether the voltage of the identification signal is output at step S5. In this manner, the inspection as to whether there is a problem in the connection between the ultrasonic motor element 1 and the drive control device 2 is repeated. When it is determined that m n at step T1, a connection error is detected. That is, basically, the connection error is detected when the above inspection is repeated n times at steps S3 to S5 and it is determined that the voltage of the identification signal is not output in every case.

The connection error in FIG. 5 means that there is a problem in the connection between the ultrasonic motor element 1 and the drive control device 2. For example, assumed as the cause are such cases as a case where the connector 9 is disconnected, a case where the connector 9 is detached from the ultrasonic motor element 1 or the drive control device 2, and a case where a contact failure occurs between the connector 9 and the ultrasonic motor element 1 or the drive control device 2.

When it is determined at step S5 that the voltage of the identification signal is output, the process proceeds to step S6. At step S6, it is determined whether the voltage of the identification signal is within a specified value (e.g., a predetermined value). This determination is made in the control unit 15C of the control circuit unit 15. To be within the above specified value specifically means to be within a set voltage value range, and an upper limit value and a lower limit value may be set. In the present embodiment, the specified value is set to identify one set of piezoelectric elements. Thus, the ultrasonic motor element 1 having the above-described one set of piezoelectric elements is identified. The specified value is set based on the resistance voltage division determined by the resistance values of the identification resistor R1 and the voltage divider circuit unit resistor R2. When a plurality of voltage divider circuit units for identifying the individual piezoelectric elements are configured, the specified value may be set to identify each of the piezoelectric elements. When it is determined at step S6 that the voltage of the identification signal is not within the specified value, the process proceeds to step T2.

At step T2, it is determined whether the counter m is smaller than the set value n. When it is determined that m<n, the process returns to step S3. After the voltage of the identification signal is measured again at step S3, the counter m is incremented by one at step S4. It is then determined whether the voltage of the identification signal is output at step S5. Thereafter, at step S6, it is determined again whether the voltage of the identification signal is within the specified value. In this manner, an inspection as to whether the piezoelectric elements are target piezoelectric elements is repeated. When it is determined that m n at step T2, resistance mismatch is detected. That is, basically, the resistance mismatch is detected when the above inspection is repeated n times at steps S3 to S6 and it is determined that the voltage of the identification signal is not within the specified value in every case. More strictly in this aspect, the number of times of inspection is the sum of the number of times of repetition of the operation through step T1 or step T2.

According to the exemplary aspect, the resistance mismatch in FIG. 5 means that the resistance value of the identification resistor R1 of the voltage divider circuit unit D does not match the resistance value of the identification resistor R1 corresponding to the target piezoelectric elements. Therefore, in the case of the resistance mismatch, the piezoelectric elements in the stator 3 are not target piezoelectric elements.

When it is determined at step S6 that the voltage of the identification signal is within the specified value, the process proceeds to step S7. At step S7, the control circuit unit 15 sets the drive condition according to the identification signal. Specifically, the drive condition is a drive frequency range, that is, a drive frequency sweep range or the like. The storage unit 15B of the control circuit unit 15 stores a plurality of drive conditions. In the present embodiment, the plurality of drive conditions are a pattern of combinations related to the drive frequency sweep range in the four piezoelectric elements.

At step S7, the control unit 15C sets the drive condition according to the voltage of the identification signal by reference to the plurality of drive conditions stored in advance in the storage unit 15B. An appropriate drive condition can be thereby set in the target piezoelectric elements. The storage unit 15B may store a plurality of patterns of combinations related to the drive frequency sweep range. In this case, the single control circuit unit 15 can handle different specified values of the voltage of the identification signal. Furthermore, the optimum combination pattern can be selected according to the specified value.

At step S8, the drive frequency sweep of the ultrasonic motor element 1 is performed based on the drive condition set in the control circuit unit 15. Specifically, the drive frequency sweep of each piezoelectric element in the ultrasonic motor element 1 is performed. Based on this drive frequency sweep, the control unit 15C of the control circuit unit 15 can be configured to set the optimum frequency of each piezoelectric element.

As described above, the sweep is performed at step S8 based on the selection of the drive frequency sweep range at step S7 to set the optimum frequency. Since the sweep is performed in an appropriate range in each piezoelectric element, the sweep time for each piezoelectric element hardly varies, and the sweep time can be shortened.

At step S9, the optimum frequency set at step S8 is applied to each piezoelectric element of the ultrasonic motor element 1. After execution of step S9, the process returns to step S2. The drive control device 2 repeats the above operation. A condition under which the process returns to step S2 from step S9 may be separately provided according to the application of the ultrasonic motor element 1. Examples of the above condition include a case where the ultrasonic motor element 1 is rotated for a certain period of time and a case where an abnormality is detected. Examples of the above condition also include a case where signal application is stopped after step S9 and a certain period of time has elapsed after the stop.

In the present embodiment, the identification resistor R1 according to the resonance frequency of each piezoelectric element in the stator 3 is used. Therefore, the resistance value of the identification resistor R1 can be set to a resistance value according to a resonance frequency deviated by mounting each piezoelectric element on the vibrator 4. As a result, efficient drive frequency sweep can be performed more reliably, and the optimum frequency can be easily set for each piezoelectric element. Consequently, the rotation efficiency of the ultrasonic motor element 1 is more easily enhanced.

The resonance frequency of each piezoelectric element may be measured after the stator 3 is mounted on the ultrasonic motor element 1. The resistance value of the identification resistor R1 may be a resistance value according to this measurement result. In this case, the resistance value of the identification resistor R1 can be set to a resistance value deviated by mounting each piezoelectric element on the ultrasonic motor element 1. As a result, efficient drive frequency sweep can be performed more reliably.

Hereinafter, an example different from the first embodiment when the voltage divider circuit unit resistor R2 is a bleeder resistor will be described.

Figure 6:
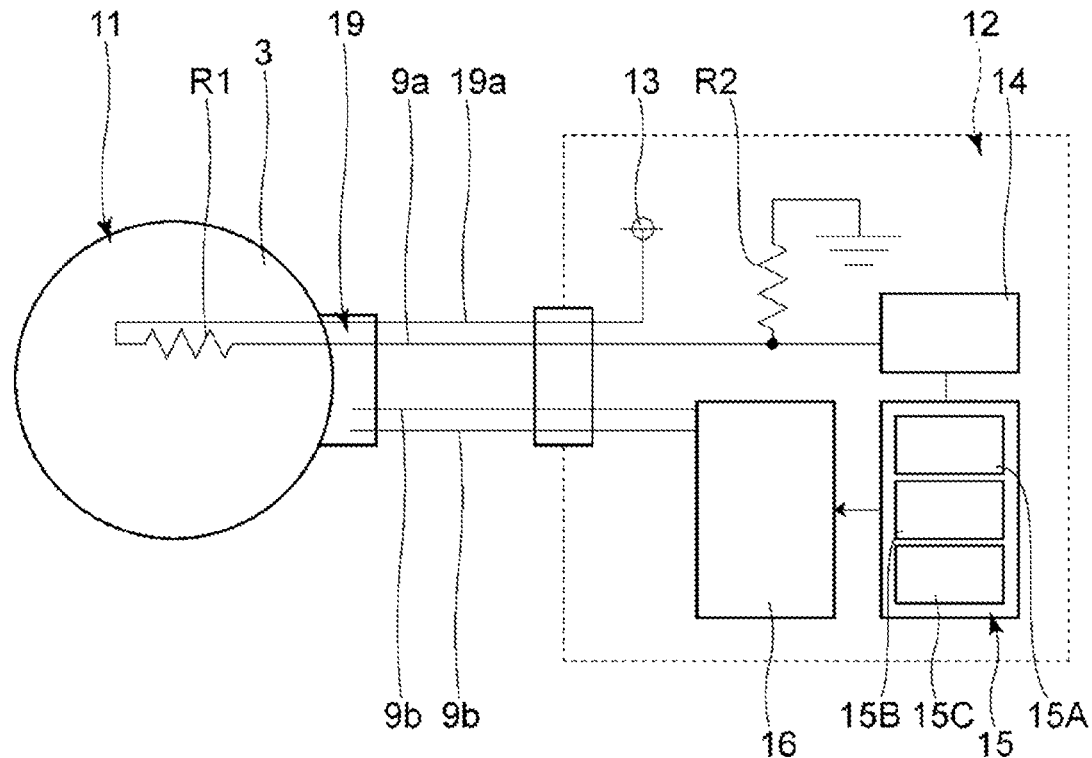
FIG. 6 is a schematic control circuit diagram of an ultrasonic motor system according to a modification of the first exemplary embodiment.

FIG. 6 is a schematic control circuit diagram of an ultrasonic motor system according to a modification of the first exemplary embodiment.

The present modification is different from the first exemplary embodiment in that the voltage divider circuit unit resistor R2 is connected to the ground potential in the voltage divider circuit unit, and in the configuration of a connector 19. More specifically, the voltage divider circuit unit resistor R2 branches on one end side so as to be connected to the identification resistor R1 and the control circuit unit 15 as in the first embodiment. In the present modification, the voltage divider circuit unit resistor R2 is connected to the ground potential on the other end side. The identification resistor R1 is connected to the voltage divider circuit unit resistor R2 on one end side, and is connected to the power supply unit 13 on the other end side. In this way, the voltage divider circuit unit is configured.

As further shown, the connector 19 of the present modification includes a power supply wire 19a in addition to the identification signal wire 9a and the drive signal wire 9b. The identification resistor R1 is connected to the power supply unit 13 by the power supply wire 19a.

Also in the present modification, the voltage divider circuit unit resistor R2 is a bleeder resistor. A drive control device 12 vibrates the piezoelectric elements to vibrate the stator 3 according to the flow illustrated in FIG. 5, in the same manner as in the first embodiment. Also in this case, the rotation efficiency of an ultrasonic motor element 11 is easily enhanced.

The generation of the traveling wave will be described below. A structure in which the plurality of piezoelectric elements are distributed in the circumferential direction and driven to generate the traveling wave in the stator 3 is disclosed in, for example, WO 2010/061508 A1, which is hereby incorporated by reference in its entirety.

Figure 7A:
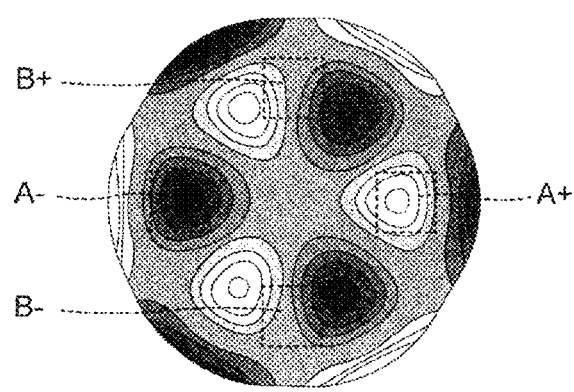
FIGS. 7(a) to 7(c) are schematic bottom views of the stator for easily explaining a traveling wave.
Figure 7B:
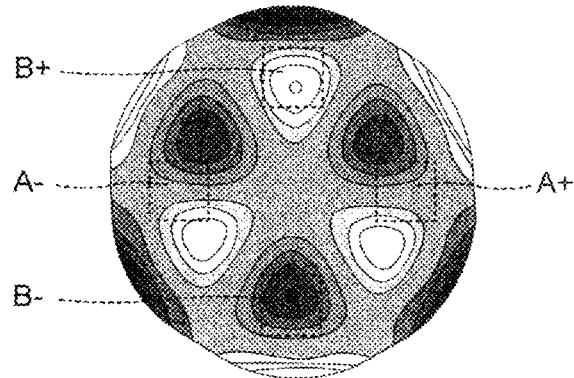
Figure 7C:
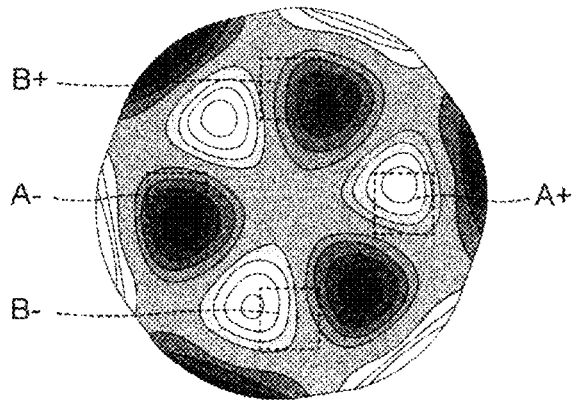

FIGS. 7(*a*) to 7(*c*) are schematic bottom views of the stator for explaining the traveling wave. In FIGS. 7(*a*) to 7(*c*), in the gray scale, the closer to black, the greater the stress in one direction, and the closer to white, the greater the stress in the other direction.

FIG. 7(*a*) illustrates a three-wave standing wave X, and FIG. 7(*b*) illustrates a three-wave standing wave Y. It is assumed that the first piezoelectric element 5A, the second piezoelectric element 5B, the third piezoelectric element 5C, and the fourth piezoelectric element 5D are spaced apart from each other at 90° central angular intervals. In this case, since the three-wave standing waves X and Y are excited, the central angle relative to the wavelength of the traveling wave is 120°. The central angle is determined to be the angle 90° by multiplying the angle 120° of one wave by ¾. The first piezoelectric element 13A is disposed at a predetermined place where the three-wave standing wave X has large amplitude, and the first, second, third, and fourth piezoelectric elements 5A, 5B, 5C, and 5D are disposed at the 90° central angular intervals. In this case, the three-wave standing waves X and Y vibrating out of phase with each other by 90° are excited, and the standing waves X and Y are combined to generate a traveling wave illustrated in FIG. 7(*c*).

In FIGS. 7(*a*) to 7(*c*), A+, A−, B+, and B− denote polarization directions of the piezoelectric body 6. The sign + means that the piezoelectric body 6 is polarized from the third main surface 6a to the fourth main surface 6b in the thickness direction. The sign − indicates that the piezoelectric body 6 is polarized in the opposite direction. Reference character A denotes the first piezoelectric element 5A and the second piezoelectric element 5B, and reference character B denotes the third piezoelectric element 5C and the fourth piezoelectric element 5D.

By generating the traveling wave traveling in the circumferential direction in the vibrator 4 as described above, the rotor 8 in contact with the second main surface 4b of the vibrator 4 rotates about the center in the axial direction Z. In the present invention, the configuration for generating the traveling wave is not limited to the configuration of the present embodiment, and a variety of conventionally known configurations for generating the traveling wave can be used.

In an exemplary aspect, a friction material may be fixed to a surface of the rotor body 8a adjacent to the stator 3. A larger frictional force can be thereby applied between the vibrator 4 of the stator 3 and the rotor 8.

In the present embodiment, the center of the traveling wave coincides with the center of the stator 3 and the center of the vibrator 4. Instead, the center of the traveling wave does not necessarily coincide with the center of the stator 3 or the center of the vibrator 4.

Figure 8:
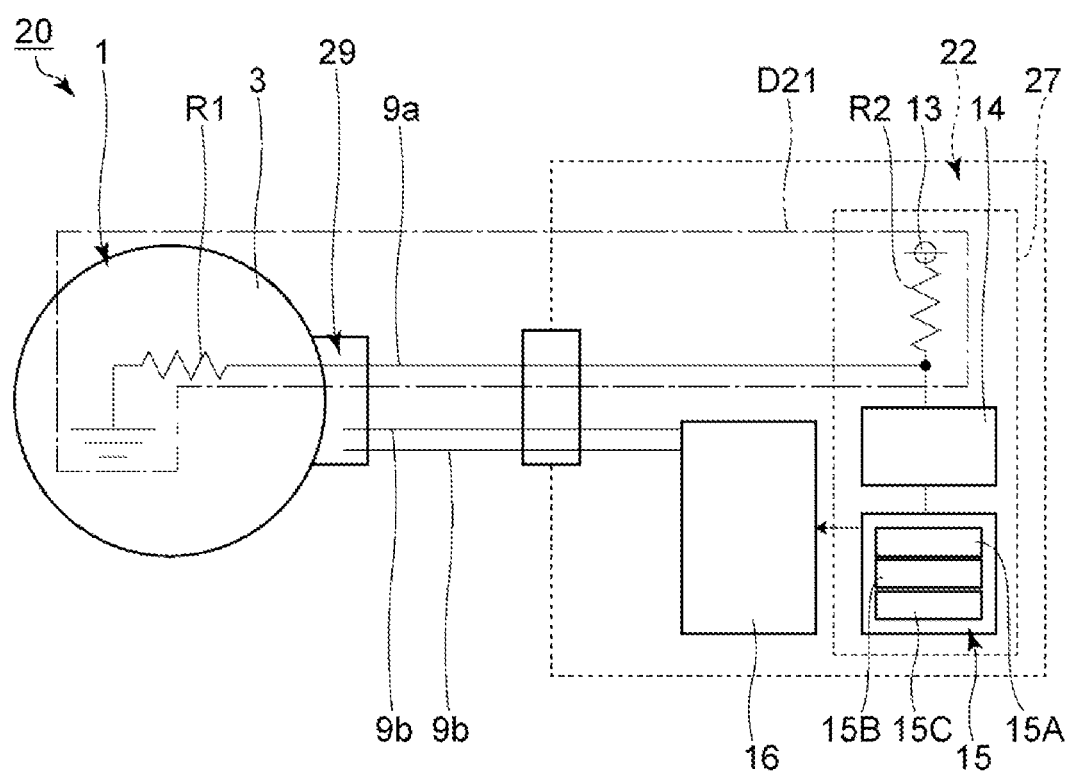
FIG. 8 is a schematic control circuit diagram of an ultrasonic motor system according to a second exemplary embodiment.

FIG. 8 is a schematic control circuit diagram of an ultrasonic motor system according to a second exemplary embodiment.

The present embodiment is different from the first exemplary embodiment in that the voltage divider circuit unit resistor R2 is a pull-up resistor and a switch is provided in a connector 29. The pull-up resistor is switched between ON and OFF by the switch. The present embodiment is further different from the first embodiment in that the power supply unit 13, the voltage divider circuit unit resistor R2, the analog-to-digital conversion unit 14, and the control circuit unit 15 are included in a single microcomputer 27. It is also noted that an ultrasonic motor system 20 of the present embodiment has a configuration similar to that of the ultrasonic motor system 10 of the first embodiment except for the above points.

In the present embodiment, the voltage divider circuit unit resistor R2 forms a voltage divider circuit unit D21 together with the identification resistor R1 of the ultrasonic motor element 1. In operation, a drive control device 22 is configured to vibrate the piezoelectric elements to vibrate the stator 3 according to a flow illustrated in FIG. 9. The flow performed by the drive control device 22 is similar to that in the first embodiment except for the ON and OFF operation of the pull-up resistor.

Figure 9:
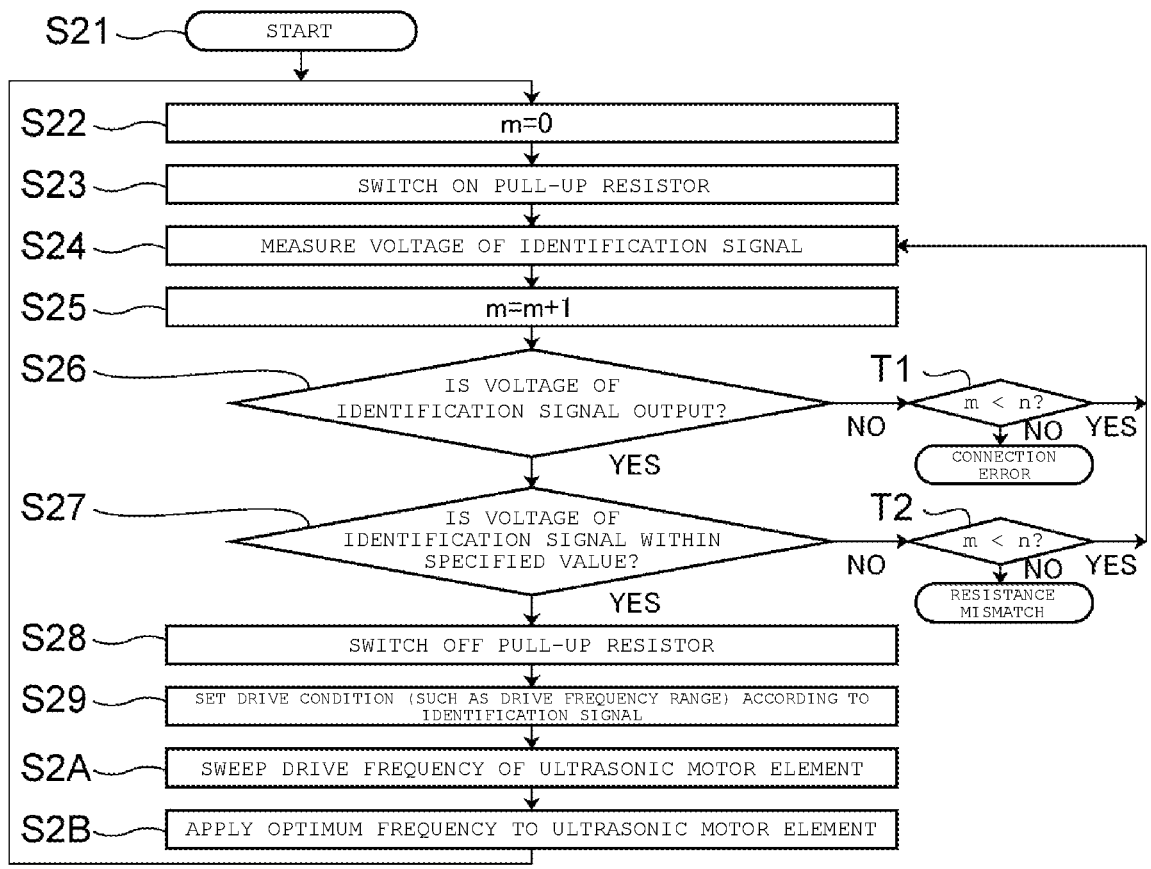
FIG. 9 is a flowchart illustrating an operation procedure of a drive control device according to the second exemplary embodiment.

FIG. 9 is a flowchart illustrating an operation procedure of the drive control device according to the second embodiment.

As illustrated in FIG. 9, the operation is started at step S21. At step S22, a counter m is set to 0. At step S23, the pull-up resistor is switched ON. For purposes of this disclosure, switching ON the pull-up resistor means electrically connecting the identification resistor R1 and the voltage divider circuit unit resistor R2. On the other hand, switching OFF the pull-up resistor means electrically separating the identification resistor R1 and the voltage divider circuit unit resistor R2. At step S24, the voltage of the identification signal is measured. At step S25, the counter m is incremented by one. At step S26, it is determined whether the voltage of the identification signal is output. When it is determined that the voltage of the identification signal is not output, the process proceeds to step T1.

At step T1, it is determined whether the counter m is smaller than a set value n. When it is determined that m<n, the process returns to step S24. On the other hand, when it is determined that m≥n at step T1, a connection error is detected.

When it is determined at step S26 that the voltage of the identification signal is output, the process proceeds to step S27. At step S27, it is determined whether the voltage of the identification signal is within a specified value. When it is determined at step S27 that the voltage of the identification signal is not within the specified value, the process proceeds to step T2.

At step T2, it is determined whether the counter m is smaller than the set value n. When it is determined that m<n, the process returns to step S24. On the other hand, when it is determined that m≥n at step T2, resistance mismatch is detected.

When it is determined at step S27 that the voltage of the identification signal is within the specified value, the process proceeds to step S28. At step S28, the pull-up resistor is switched OFF. At step S29, the control circuit unit 15 sets the drive condition according to the identification signal. At step S2A, the drive frequency sweep of the ultrasonic motor element 1 is performed based on the drive condition set in the control circuit unit 15. Based on this drive frequency sweep, the control unit 15C of the control circuit unit 15 sets the optimum frequency of each piezoelectric element. At step S2B, the optimum frequency set at step S2A is applied to each piezoelectric element of the ultrasonic motor element 1. After execution of step S2B, the process returns to step S22. The drive control device 22 repeats the above operation.

Also in the present embodiment, the frequency sweep suitable for each piezoelectric element can be performed as in the first embodiment. Therefore, the frequency sweep time can be shortened, and the time hardly varies. Consequently, an optimum frequency can be easily set for each piezoelectric element, and the rotation efficiency of the ultrasonic motor element 1 can be easily enhanced.

Figure 10:
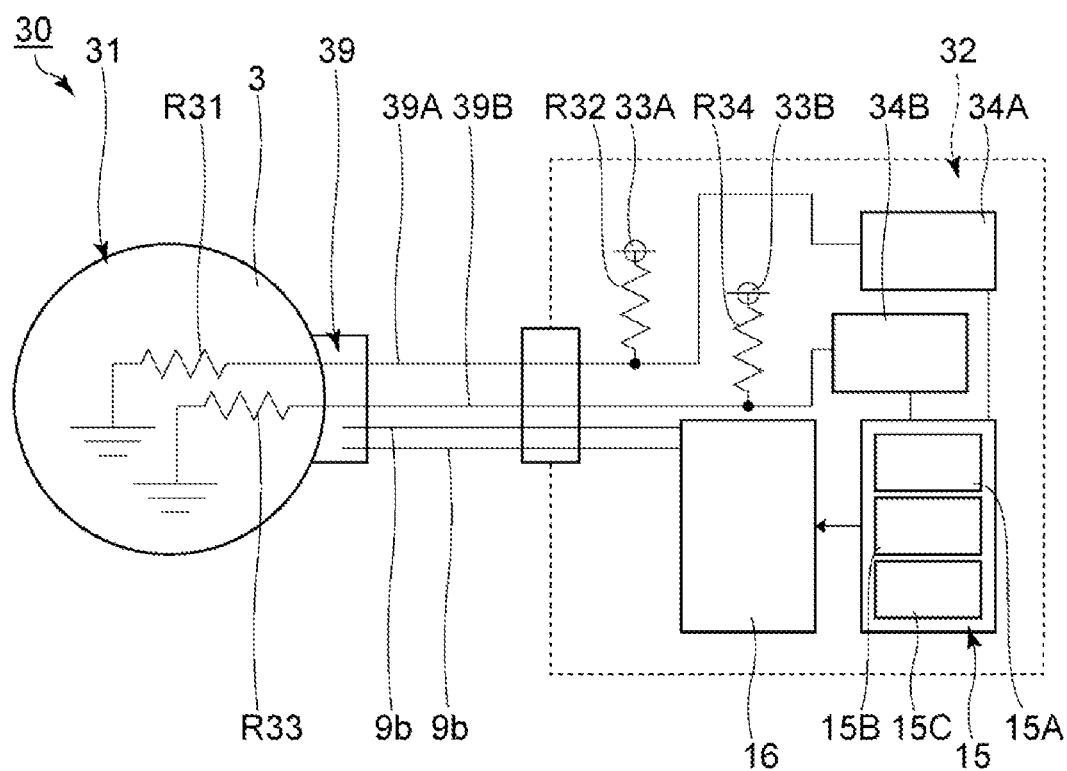
FIG. 10 is a schematic control circuit diagram of an ultrasonic motor system according to a third exemplary embodiment.

FIG. 10 is a schematic control circuit diagram of an ultrasonic motor system according to a third exemplary embodiment.

The present embodiment is different from the first exemplary embodiment in that a plurality of sets of identification resistors, and a plurality of sets of voltage divider circuit unit resistors, power supply units, and analog-to-digital converters are provided. An ultrasonic motor system 30 of the present embodiment has a configuration similar to that of the ultrasonic motor system 10 of the first embodiment except for the above points.

A first identification resistor R31 and a second identification resistor R33 are disposed in an ultrasonic motor element 31. The first identification resistor R31 has, for example, a resistance value according to the piezoelectric elements to which in-phase signals are applied. The same applies to the second identification resistor R33. More specifically, in the present embodiment, the first identification resistor R31 has a resistance value according to the first piezoelectric element 5A and the second piezoelectric element 5B. The second identification resistor R33 has a resistance value according to the third piezoelectric element 5C and the fourth piezoelectric element 5D. However, it is noted that the present embodiment is not limited to the above configuration, and each of the first identification resistor R31 and the second identification resistor R33 may have a resistance value according to the piezoelectric elements to which out-of-phase signals are applied.

Although the present diagram illustrates the system configuration including the two identification resistors, three or more identification resistors may be provided in alternative aspects.

In the present embodiment, the first identification resistor R31 and the second identification resistor R33 are provided to identify the ultrasonic motor element 31. More specifically, the first identification resistor R31 is provided to identify one of two sets of piezoelectric elements in the ultrasonic motor element 31. The second identification resistor R33 is provided to identify the other of the two sets of piezoelectric elements. As described above, the identification resistor may be provided to identify one set of piezoelectric elements among a plurality of sets of piezoelectric elements included in one stator. The plurality of identification resistors may be provided to identify the ultrasonic motor element having the plurality of sets of piezoelectric elements.

Moreover, in this aspect, a drive control device 32 includes a first power supply unit 33A and a second power supply unit 33B, a first voltage divider circuit unit resistor R32 and a second voltage divider circuit unit resistor R34, and a first analog-to-digital conversion unit 34A and a second analog-to-digital conversion unit 34B. A connector 39 includes a first identification signal wire 39A and a second identification signal wire 39B.

The first voltage divider circuit unit resistor R32 forms a first voltage divider circuit unit together with the first identification resistor R31. The first voltage divider circuit unit is configured similarly to the voltage divider circuit unit D in the first embodiment. More specifically, the first voltage divider circuit unit resistor R32 and the first identification resistor R31 are connected by the first identification signal wire 39A. Furthermore, the first voltage divider circuit unit resistor R32 is connected to the first power supply unit 33A. The first voltage divider circuit unit is connected to the first analog-to-digital conversion unit 34A. The first voltage divider circuit unit outputs a first identification signal.

The second voltage divider circuit unit resistor R34 forms a second voltage divider circuit unit together with the second identification resistor R33. The second voltage divider circuit unit is configured similarly to the voltage divider circuit unit D in the first embodiment. More specifically, the second voltage divider circuit unit resistor R34 and the second identification resistor R33 are connected by the second identification signal wire 39B. Furthermore, the second voltage divider circuit unit resistor R34 is connected to the second power supply unit 33B. The second voltage divider circuit unit is connected to the second analog-to-digital conversion unit 34B. The second voltage divider circuit unit outputs a second identification signal.

The first analog-to-digital conversion unit 34A and the second analog-to-digital conversion unit 34B are connected to the control circuit unit 15. In operation, the drive control device 32 is configured to vibrate the piezoelectric elements to vibrate the stator 3 according to a flow illustrated in FIG. 11. The flow performed by the drive control device 32 is similar to that in the first embodiment except for the operation of individually measuring the voltages of the first identification signal and the second identification signal.

Figure 11:
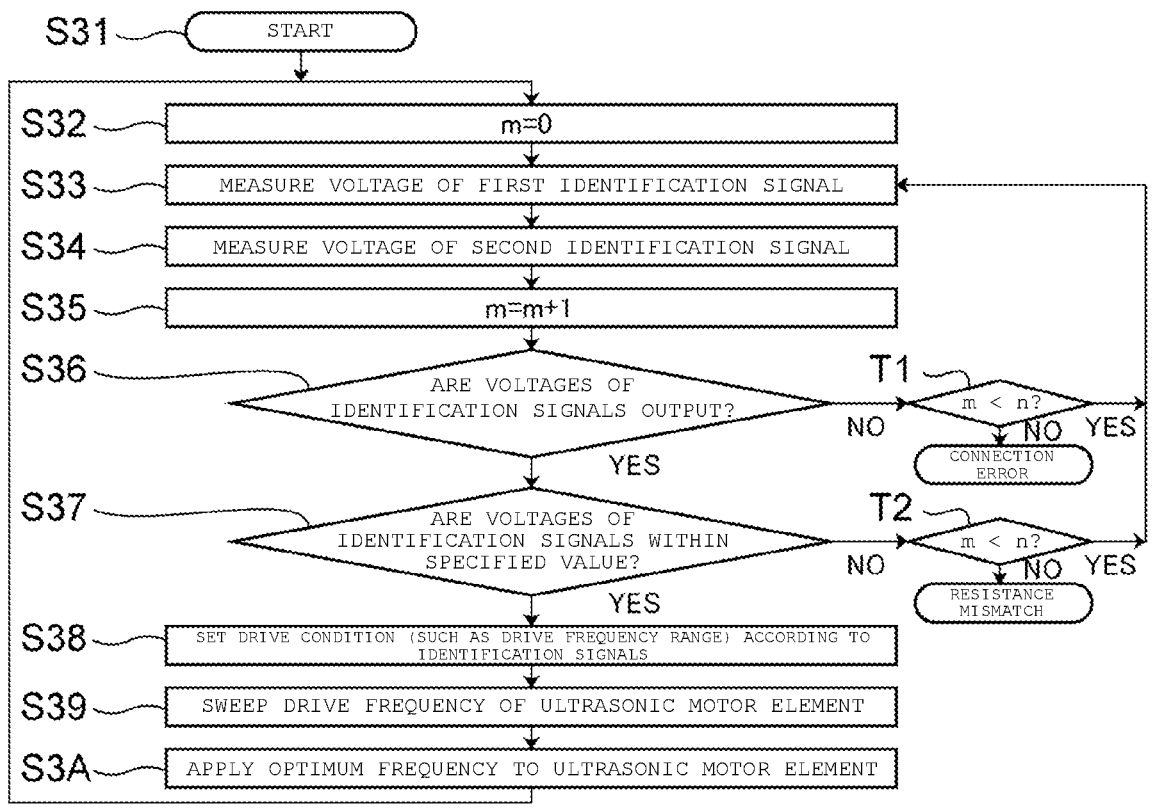
FIG. 11 is a flowchart illustrating an operation procedure of a drive control device according to the third exemplary embodiment.

FIG. 11 is a flowchart illustrating an operation procedure of the drive control device according to the third embodiment.

As illustrated in FIG. 11, the operation is started at step S31. At step S32, a counter m is set to 0. At step S33, the voltage of the first identification signal output from the first voltage divider circuit unit is measured. At step S34, the voltage of the second identification signal output from the second voltage divider circuit unit is measured. At step S35, the counter m is incremented by one. At step S36, it is determined whether the voltages of the identification signals are output. More specifically, it is determined whether the voltages of both the first identification signal and the second identification signal are output. When it is determined that the voltage of the first identification signal or the second identification signal is not output, the process proceeds to step T1.

At step T1, it is determined whether the counter m is smaller than a set value n. When it is determined that m<n, the process returns to step S33. On the other hand, when it is determined that m n at step T1, a connection error is detected.

When it is determined at step S36 that the voltages of both the first identification signal and the second identification signal are output, the process proceeds to step S37. At step S37, it is determined whether the voltages of the identification signals are within a specified value. More specifically, it is determined whether the voltages of both the first identification signal and the second identification signal are within the specified value.

The specified value of the voltage of the first identification signal and the specified value of the voltage of the second identification signal are individually set. In the present embodiment, each specified value is set to identify one set of piezoelectric elements among a plurality of sets of piezoelectric elements included in the single stator 3. Thus, the ultrasonic motor element 31 having the plurality of sets of piezoelectric elements is identified. The specified value of the voltage of the first identification signal is set based on the resistance voltage division determined by the resistance values of the first identification resistor R31 and the first voltage divider circuit unit resistor R32. The specified value of the voltage of the second identification signal is set based on the resistance voltage division determined by the resistance values of the second identification resistor R33 and the second voltage divider circuit unit resistor R34. When it is determined at step S37 that the voltage of the first identification signal is not within the specified value, or that the voltage of the second identification signal is not within the specified value, the process proceeds to step T2.

At step T2, it is determined whether the counter m is smaller than the set value n. When it is determined that m<n, the process returns to step S33. On the other hand, when it is determined that m≥n at step T2, resistance mismatch is detected.

When it is determined at step S37 that the voltage of the first identification signal is within the specified value, and that the voltage of the second identification signal is within the specified value, the process proceeds to step S38. At step S38, the control circuit unit 15 sets the drive condition according to the identification signals. In the present embodiment, the storage unit 15B of the control circuit unit 15 stores a plurality of patterns of combinations related to the drive frequency sweep range in the two piezoelectric elements. At step S38, the control unit 15C selects the drive condition according to the voltage of the first identification signal from the plurality of drive conditions stored in advance in the storage unit 15B. An appropriate drive condition can be thereby set in the first piezoelectric element 5A and the second piezoelectric element 5B. Similarly, the control unit 15C selects the drive condition according to the voltage of the second identification signal from the plurality of drive conditions stored in advance in the storage unit 15B. An appropriate drive condition can be thereby set in the third piezoelectric element 5C and the fourth piezoelectric element 5D.

At step S39, the drive frequency sweep of the ultrasonic motor element 31 is performed based on the drive conditions set in the control circuit unit 15. Based on this drive frequency sweep, the control unit 15C of the control circuit unit 15 is configured to set the optimum frequency of each piezoelectric element. At step S3A, the optimum frequency set at step S39 is applied to each piezoelectric element of the ultrasonic motor element 31. After execution of step S3A, the process returns to step S32. The drive control device 32 repeats the above operation.

Also in the present embodiment, the frequency sweep suitable for each piezoelectric element can be performed as in the first embodiment. Therefore, the frequency sweep time can be shortened, and the time hardly varies. Consequently, the optimum frequency can be easily set for each piezoelectric element, and the rotation efficiency of the ultrasonic motor element 31 can be easily enhanced.

In the third embodiment, the first analog-to-digital conversion unit 34A is connected between the first voltage divider circuit unit and the control circuit unit 15. The second analog-to-digital conversion unit 34B is connected between the second voltage divider circuit unit and the control circuit unit 15. Instead, one analog-to-digital conversion unit may be provided in a case where the plurality of voltage divider circuit units are provided. This example is described below.

Figure 12:
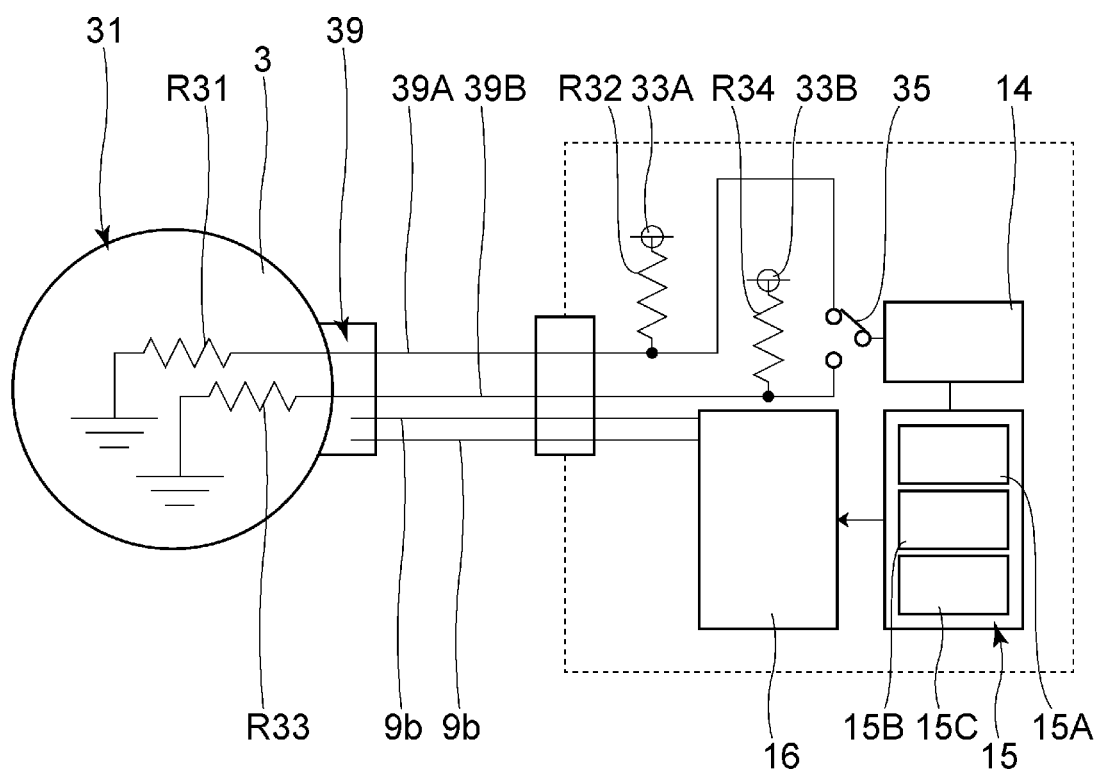
FIG. 12 is a schematic control circuit diagram of an ultrasonic motor system according to a modification of the third exemplary embodiment.

FIG. 12 is a schematic control circuit diagram of an ultrasonic motor system according to a modification of the third exemplary embodiment.

In the present modification of the exemplary embodiment, a selection switch 35 is provided between the first and second voltage divider circuit units and the control circuit unit 15. The selection switch 35 is configured to switch connections between the plurality of voltage divider circuit units and the control circuit unit 15. The analog-to-digital conversion unit 14 is connected between the selection switch 35 and the control circuit unit 15. Also in the present modification, the piezoelectric elements are vibrated to vibrate the stator 3 according to the flow illustrated in FIG. 11, in the same manner as in the third embodiment. Also in this case, the rotation efficiency of the ultrasonic motor element 31 can be easily enhanced.

In the third embodiment, the example in which the two voltage divider circuit units are provided has been described. However, it is noted that the present invention is not limited thereto, and three or more voltage divider circuit units may be provided according to the number of piezoelectric elements or the number of sets of piezoelectric elements.

Figure 13:
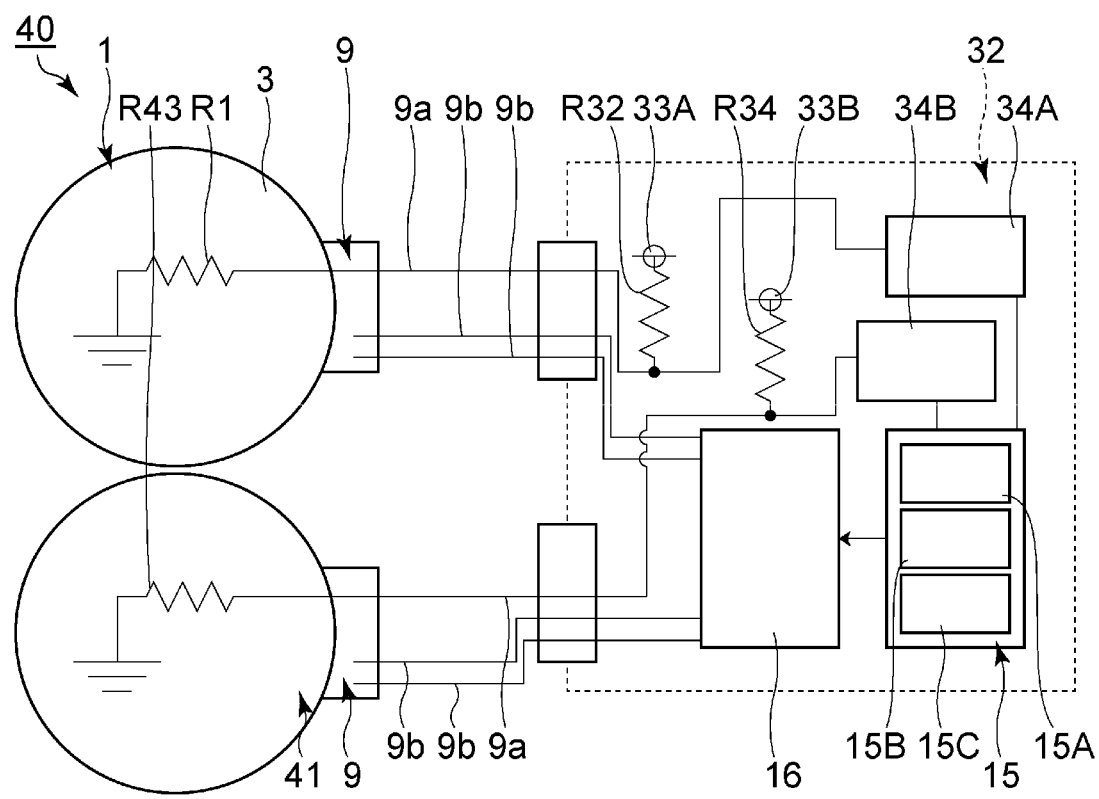
FIG. 13 is a schematic control circuit diagram of an ultrasonic motor system according to a fourth exemplary embodiment exemplary.

FIG. 13 is a schematic control circuit diagram of an ultrasonic motor system according to a fourth exemplary embodiment.

An ultrasonic motor system 40 includes the ultrasonic motor element 1 and an ultrasonic motor element 41. The ultrasonic motor element 1 and the ultrasonic motor element 41 have a configuration similar to that of the ultrasonic motor element 1 of the first embodiment. The drive control device 32 in the ultrasonic motor system 40 is configured to drive the plurality of ultrasonic motor elements. The drive control device 32 has a configuration similar to that of the drive control device 32 of the third embodiment. In the present embodiment, a plurality of connectors 9 are connected to the drive control device 32. The drive control device 32 is connected to the plurality of ultrasonic motor elements by the plurality of connectors 9.

The resistance value of the identification resistor R1 of the ultrasonic motor element 1 and a resistance value of an identification resistor R43 of the ultrasonic motor element 41 are different from each other. The identification resistor R1 is provided to identify the ultrasonic motor element 1. More specifically, the identification resistor R1 of the ultrasonic motor element 1 is provided to identify a set of piezoelectric elements in the ultrasonic motor element 1. Similarly, the identification resistor R43 is provided to identify the ultrasonic motor element 41. More specifically, the identification resistor R43 of the ultrasonic motor element 41 is provided to identify a set of piezoelectric elements in the ultrasonic motor element 41.

The identification resistor R1 of the ultrasonic motor element 1 forms a first voltage divider circuit unit together with the first voltage divider circuit unit resistor R32 of the drive control device 32. On the other hand, the identification resistor R43 of the ultrasonic motor element 41 forms a second voltage divider circuit unit together with the second voltage divider circuit unit resistor R34 of the drive control device 32. The first voltage divider circuit unit outputs the first identification signal, and the second voltage divider circuit unit outputs the second identification signal. In the ultrasonic motor system 40, the piezoelectric elements in each ultrasonic motor element can be identified. Each ultrasonic motor element can be thereby identified.

Also in the present embodiment, the piezoelectric elements are vibrated to vibrate each stator of each ultrasonic motor element according to the flow illustrated in FIG. 11, in the same manner as in the third exemplary embodiment. Also in this case, the optimum frequency can be easily set for each piezoelectric element in each ultrasonic element. Consequently, the rotation efficiency of the plurality of ultrasonic motor elements can be easily enhanced.

In the fourth exemplary embodiment, the example in which the ultrasonic motor system 40 includes the two ultrasonic motor elements has been described. However, it is noted that the exemplary embodiments of the present invention are not limited thereto, and the ultrasonic motor system 40 may include three or more ultrasonic motor elements. Moreover, three or more voltage divider circuit units may be provided according to the number of ultrasonic motor elements, the number of piezoelectric elements, or the number of sets of piezoelectric elements.

DESCRIPTION OF REFERENCE SYMBOLS

1: Ultrasonic motor element
2: Drive control device
3: Stator
4: Vibrator
4a, 4b: First and second main surfaces
5A to 5D: First to fourth piezoelectric elements
6: Piezoelectric body
6a, 6b: Third and fourth main surfaces
7A, 7B: First and second electrodes
8: Rotor
8a: Rotor body
8b: Rotating shaft
9: Connector
9a: Identification signal wire
9b: Drive signal wire
10: Ultrasonic motor system
11: Ultrasonic motor element
12: Drive control device
13: Power supply unit
14: Analog-to-digital conversion unit
15: Control circuit unit
15A: Measurement unit
15B: Storage unit
15C: Control unit
16: Drive circuit unit
19: Connector
19a: Power supply wire
20: Ultrasonic motor system
22: Drive control device
27: Microcomputer
29: Connector
30: Ultrasonic motor system
31: Ultrasonic motor element
32: Drive control device
33A, 33B: First and second power supply units
34A, 34B: First and second analog-to-digital conversion units
35: Selection switch
39: Connector
39A, 39B: First and second identification signal wires
40: Ultrasonic motor system
41: Ultrasonic motor element
D, D21: Voltage divider circuit unit
R1: Identification resistor
R2: Voltage divider circuit unit resistor
R31: First identification resistor
R32: First voltage divider circuit unit resistor
R33: Second identification resistor
R34: Second voltage divider circuit unit resistor
R43: Identification resistor

The invention claimed is:

1. A drive control device for driving an ultrasonic motor element including a piezoelectric element, the drive control device comprising:
 a voltage divider circuit formed by a voltage divider circuit unit resistor and an identification resistor that identifies the ultrasonic motor element;
 a control circuit unit connected to the voltage divider circuit unit and configured to set a drive condition of the ultrasonic motor element based on a voltage of an identification signal that identifies the ultrasonic motor element; and
 a drive circuit unit configured to apply a drive voltage to the piezoelectric element based on the drive condition set by the control circuit unit
 wherein:
  the control circuit unit is configured to set a sweep range of a drive frequency of the piezoelectric element,
  the drive circuit unit is configured to sweep the drive frequency of the piezoelectric element within the sweep range of the drive frequency set by the control circuit unit, and
  the control circuit unit is configured to set the drive condition based on a result of the sweep of the drive frequency.

2. The drive control device according to claim 1, wherein the control circuit unit includes a storage unit configured to store a plurality of patterns of the sweep range of the drive frequency.

3. The drive control device according to claim 2, wherein the control circuit unit includes a control unit configured to select the sweep range of the drive frequency from the plurality of patterns and to set the drive condition.

4. The drive control device according to claim 1, wherein the voltage divider circuit unit resistor branches on one end side so as to be connected to the identification resistor and the control circuit unit.

5. The drive control device according to claim 4, wherein the voltage divider circuit unit resistor branches on another side so as to be connected to a power supply.

6. The drive control device according to claim 1, further comprising a plurality of the voltage divider circuit unit resistors each forming the voltage divider circuit unit with a plurality of the identification resistors, respectively.

7. The drive control device according to claim 6, further comprising a selection switch disposed between the plurality of voltage divider circuit units and the control circuit unit and configured to switch connections between each of the plurality of voltage divider circuit units and the control circuit unit.

8. The drive control device according to claim 7, further comprising an analog-to-digital conversion unit connected between the selection switch and the control circuit unit and configured to digitally convert the identification signal.

9. An ultrasonic motor system comprising:
the drive control device according to claim 1; and
the ultrasonic motor element including the piezoelectric element and the identification resistor.

10. An ultrasonic motor system comprising:
the drive control device according to claim 6; and
the ultrasonic motor element that includes a plurality of the piezoelectric elements and a plurality of the identification resistors.

11. An ultrasonic motor system comprising:
the drive control device according to claim 6; and
a plurality of the ultrasonic motor elements that each include the piezoelectric element and the identification resistor.

12. The drive control device according to claim 1, further comprising a single microcomputer that includes the voltage divider circuit, the control circuit and the drive circuit.

13. A drive control device for driving an ultrasonic motor element including a piezoelectric element, the drive control device comprising:
a voltage divider circuit formed by a voltage divider circuit unit resistor and an identification resistor that identifies the ultrasonic motor element;
a control circuit unit connected to the voltage divider circuit unit and configured to set a drive condition of the ultrasonic motor element based on a voltage of an identification signal that identifies the ultrasonic motor element;
a drive circuit unit configured to apply a drive voltage to the piezoelectric element based on the drive condition set by the control circuit unit; and
an analog-to-digital conversion unit connected between the voltage divider circuit unit and the control circuit unit and configured to digitally convert the identification signal.

14. The drive control device according to claim 13, wherein the voltage divider circuit unit resistor branches on one end side so as to be connected to the identification resistor and the control circuit unit.

15. The drive control device according to claim 14, wherein the voltage divider circuit unit resistor branches on another side so as to be connected to ground potential.

16. The drive control device according to claim 15, wherein:
the voltage divider circuit unit resistor is a pull-up resistor, and
the drive control device further comprises a switch configured to switch a connection between the voltage divider circuit unit resistor and the identification resistor between an ON state and an OFF state.

17. A method for driving an ultrasonic motor element including a piezoelectric element, the method comprising:
measuring an identification signal from an identification resistor that forms a voltage divider circuit with a voltage divider circuit unit resistor;
setting, by a control circuit unit coupled to the voltage divider circuit, a drive condition of the ultrasonic motor element based on a voltage of an identification signal that identifies the ultrasonic motor element;
applying a drive voltage to the piezoelectric element based on the drive condition set by the control circuit unit;
wherein the setting of the drive condition further comprises:
setting, by the control circuit unit, a sweep range of a drive frequency of the piezoelectric element;
sweeping the drive frequency of the piezoelectric element within the sweep range of the drive frequency set by the control circuit unit; and
setting, by the control circuit unit, the drive condition based on a result of the sweep of the drive frequency.

18. The method according to claim 17, further comprising:
storing a plurality of patterns of the sweep range of the drive frequency; and
selecting, by the control circuit unit, the sweep range of the drive frequency from the plurality of patterns and setting the drive condition.

* * * * *